May 1, 1962  R. S. LEE  3,032,426
MOLD COMPOSITION CURE ACCELERATOR
Filed Feb. 29, 1960
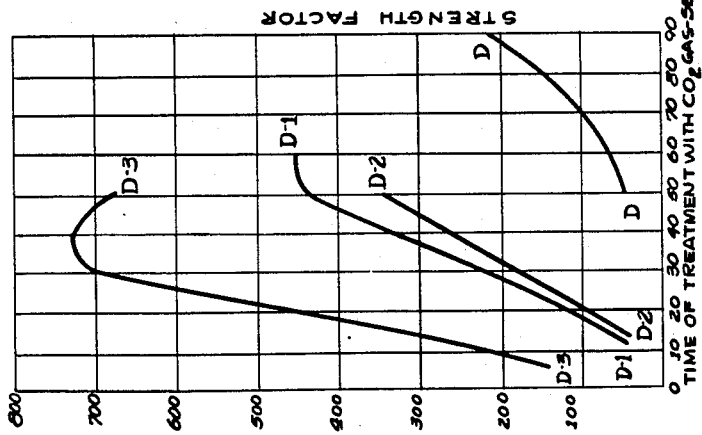
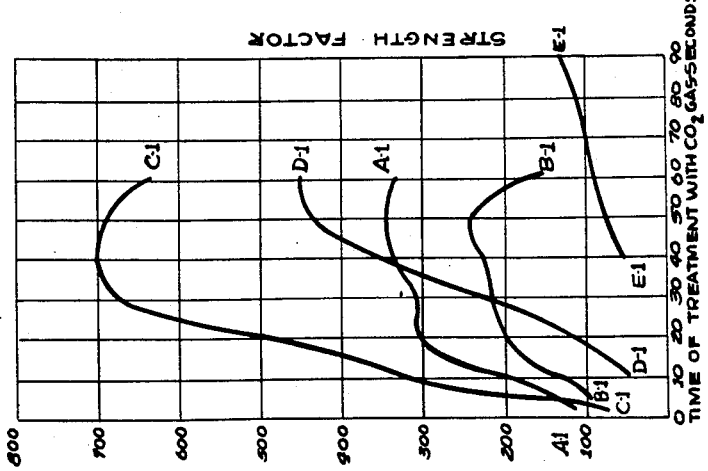
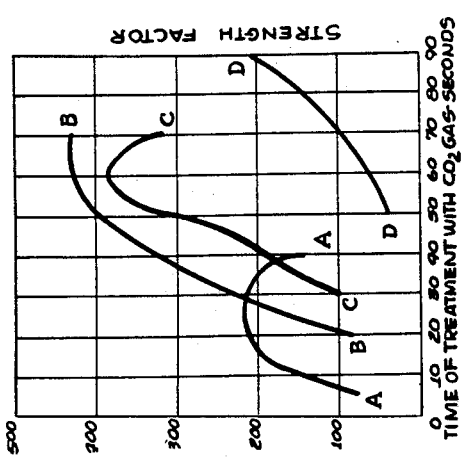
INVENTOR
ROBERT S. LEE
Paul D. Pippel
ATTORNEY

United States Patent Office 3,032,426
Patented May 1, 1962

3,032,426
MOLD COMPOSITION CURE ACCELERATOR
Robert S. Lee, Chicago, Ill., assignor to International Harvester Company, Chicago, Ill., a corporation of New Jersey
Filed Feb. 29, 1960, Ser. No. 11,548
15 Claims. (Cl. 106—38.35)

This invention relates to compositions of matter for making refractory material such as foundry cores and mold parts. More in particular this invention relates to carbon dioxide cure accelerators for mold compositions containing alkali metal silicates.

The use of alkali metal silicates as bonding agents in molding sand compositions has long been known as is evidenced by U.S. Patent No. 1,889,007. Baking of silicate bonded cores to harden them is also known in the art. Further it is also known in the art to "cure" such cores by subjecting them to treatment with carbon dioxide as is evidenced by U.S. Patents Nos. 2,861,893 and 2,883,723 to Brewster and Moore et al., respectively. However, the known treatment of such cores with carbon dioxide is expensive and time consuming. It is a principal object of the present invention to provide a mold composition containing alkali metal silicates with an accelerating agent to hasten materially the cure thereof by carbon dioxide.

A further object of the invention is to provide a cure accelerator for silicate bonded mold parts whereby the time of carbon dioxide cure treatment is materially reduced.

A still further object of the invention is to provide a cure accelerator for alkali-metal silicate bonded mold parts whereby the amount of carbon dioxide required for curing is materially reduced.

A yet further object of the invention is to provide a cure accelerator for silicate bonded mold parts wherein the cure accelerator is a small amount of ethanolamine.

Another important object of the invention is the production of silicate bonded mold parts at reduced expense.

These and other desirable and important objects inherent in and encompassed by the invention will be more readily understood from the ensuing description, the appended claims and the annexed drawings wherein:

FIGURE 1 illustrates graphically the carbon dioxide curing characteristics of mold part compositions employing sodium silicate of different soda-to-silica ratios without the cure accelerating agent of this invention.

FIGURE 2 illustrates graphically the carbon dioxide curing characteristics of mold part compositions of FIGURE 1 but including about 0.2 percent by weight of a cure accelerating agent of this invention.

FIGURE 3 illustrates graphically the carbon dioxide curing characteristics of mold part compositions employing sodium silicate having a soda-to-silica ratio within the preferred range and varying amounts of a cure accelerating agent of this invention.

As stated previously the employment of silicates, particularly sodium silicate, as bonding agent for mold parts is known. Hardening or curing of such mold parts by baking or treating with carbon dioxide gas is also known. This invention contemplates the use of certain sodium silicates as bonding agents cured by treatment with carbon dioxide. However, the crux of this invention is the addition of a small amount of a cure accelerating agent to reduce the time required for curing as well as a substantial reduction in the amount of carbon dioxide required for curing thereby reducing the cost of mold parts.

During the course of this investigation it developed that the ratio of soda, expressed as $Na_2O$, to that of silica, expressed as $SiO_2$, of the sodium silicate bonding agent is important. Ratios of 1 part soda to less than 1.90 parts silica were found inferior. Ratios of 1 part soda to more than about 2.90 parts silica also were inferior. However, when the ratio of soda to silica was in the range of 1 part soda to at least 2.00 parts silica and up to 2.40 parts silica by weight, excellent results were obtained in accordance with this invention. Preferably the range of soda-to-silica should be 1 part soda to 2.00–2.40 parts silica. However, ratios of 1 part soda to 1.90–2.90 parts silica are usable. More alkaline silicates are not generally suited for foundry use while higher ratio silica tend to be jelled when employing the cure accelerator of this invention.

In order to establish the critical limits of the ratio of soda-to-silica five aqueous solutions were first made as shown below:

Table I

| Solution | $Na_2O/SiO_2$ Ratio | Degrees Baumé | Percent $Na_2O$ | Percent $SiO_2$ | Percent $H_2O$ | Viscosity, Poises | Percent Solids | Approx. pH |
|---|---|---|---|---|---|---|---|---|
| AA | 1:2.90 | 47 | 11.0 | 31.9 | 57.0 | 9.6 | 43.0 | 11.5 |
| BB | 1:2.58 | 49 | 12.8 | 31.7 | 55.5 | 8.0 | 44.5 | 11.7 |
| CC | 1:2.40 | 52 | 13.8 | 33.1 | 53.0 | 17.0 | 47.0 | 11.9 |
| DD | 1:2.00 | 50.5 | 14.7 | 29.4 | 55.8 | 3.5 | 44.2 | 12.2 |
| EE | 1:1.60 | 58.5 | 19.5 | 31.2 | 49.1 | 70.0 | 50.9 | 12.8 |

Silica sand mixes were made employing for each of the silicate solutions of Table I in an amount of 25 lbs. The sand was of AFS (American Foundry Society) fineness number 50 washed and dried in a 50 lb. conventional Simpson intensive mixer. The amount of each silicate solution of Table I was varied to give a constant weight of total sodium silicate solids in each mix. The weight of added water was constant in each case, being 0.06 lb. The following Table II shows the amount of each sodium silicate solution added to 25 lbs. lots of the above described washed and dried sand.

Table II

| Sodium silicate solution: | Amount added, lbs. |
|---|---|
| AA | 0.76 |
| BB | 0.74 |
| CC | 0.70 |
| DD | 0.75 |
| EE | 0.65 |

In accordance with the above several test specimen mold parts were made from each of the compositions shown in Table III below:

Table III

| Composition—Sand | | Sodium Silicate Solution | | Water, lbs. | Cure Accelerator | | |
|---|---|---|---|---|---|---|---|
| Designation | lbs. | Designation | lbs. | | Designation[1] | lbs. | Percent |
| A | 25 | AA | 0.76 | 0.06 | | | |
| B | 25 | BB | 0.74 | 0.06 | | | |
| C | 25 | CC | 0.70 | 0.06 | | | |
| D | 25 | DD | 0.75 | 0.06 | | | |
| E | 25 | EE | 0.65 | 0.06 | | | |
| A-1 | 25 | AA | 0.76 | 0.06 | (a) | 0.05 | 0.2 |
| B-1 | 25 | BB | 0.74 | 0.06 | (a) | 0.05 | 0.2 |
| C-1 | 25 | CC | 0.70 | 0.06 | (a) | 0.05 | 0.2 |
| D-1 | 25 | DD | 0.75 | 0.06 | (a) | 0.05 | 0.2 |
| E-1 | 25 | EE | 0.65 | 0.06 | (a) | 0.05 | 0.2 |
| D-2 | 25 | DD | 0.75 | 0.06 | (a) | 0.025 | 0.1 |
| D-3 | 25 | DD | 0.75 | 0.06 | (a) | 0.075 | 0.3 |
| D-4 | 25 | DD | 0.75 | 0.06 | (b) | 0.05 | 0.2 |
| D-5 | 25 | DD | 0.75 | 0.06 | (c) | 0.075 | 0.3 |

[1] (a) is diethanolamine; (b) is monoethanolamine; (c) is triethanolamine.

Each of the above compositions was mulled for 4 minutes when the specified ingredients were added together.

All test specimens made from the above referred to compositions were 1" x 1" x 8" standard transverse test bars. A weighed amount, 300 grams, of the composition under test was rammed in a conventional Dietert transverse test bar flask employing a conventional Dietert standard rammer. The rammed specimen was struck off and immediately placed in a carbon dioxide gassing fixture, described later herein, without weights or clamps. After treating the specimen with carbon dioxide gas the test bar specimen was removed from the gassing fixture and immediately broken under transverse test on 6 inch centers of a conventional Dietert universal sand tester fitted with a transverse test accessory. After breaking the specimen, scratch hardness readings were determined on an unbroken portion thereof employing a conventional Dietert scratch tester.

The above described Dietert test equipment and methods of test are described in Foundry Sand Handbook, 6th edition, 1952, published by the American Foundrymen's Society, Chicago, Illinois. Section 14, paragraphs 26 to 45 on pages 145–149 describe the transverse test. FIGURE 69 on page 146 shows the standard rammer and FIGURE 70 on page 147 shows the strength testing machine. FIGURE 78 on page 166 shows the scratch hardness tester.

For the average values obtained by testing, both scratch and transverse strength, a minimum of five specimens was used to determine each result shown in FIGURES 1, 2 and 3 and elsewhere herein.

The carbon dioxide gas curing fixture comprised a closed box of wood construction having inside dimensions of 5" x 1½" x 11¾" with a 1" x 8" slot opening in the top. The slot opening was covered by a fine meshed screen. The test bar or specimen was placed on this screen as a support. The carbon dioxide was introduced into the box from below at a gage pressure of about 19 p.s.i. and about 15 p.s.i. flow pressure from a conventional 50 lb. capacity metal cylinder with a conventional pressure regulator.

Test specimens were prepared from each of the mold part compositions described in Table III and immediately treated by carbon dioxide gas as described above at room temperature about 70° F. (gas temperature 36–42° F.), taking care to record the number of seconds each specimen was exposed to the carbon dioxide. Immediately after the gas treatment the specimens were tested for scratch hardness and transverse strength. The individual values obtained for scratch hardness and transverse strength were averaged where the composition and time of carbon dioxide treatment were the same.

For purpose of illustrating the results graphically in FIGURES 1, 2 and 3, the ordinates represent an arbitrary result termed, for convenience herein, "strength factor." The strength factor thus represented by the ordinates is defined according to the following formula:

Strength factor = transverse strength × scratch hardness number where the transverse strength and scratch hardness are the average value obtained in accordance with that described above.

Mold parts having a transverse strength below 3 lbs., and a scratch hardness reading below about 30 were considered unusable. Although scratch hardness test results were found to always rise with transverse strength the mathematical relationship between the two apparently is not simple. Thus it is apparent that mold parts having a strength factor, as defined above, below about 90 are unusable. On the other hand, the higher the strength factor value obtained the higher degree of quality of the resulting mold parts is attained.

Referring now to FIGURE 1 of the drawings the graphs therein show the strength factors versus time of treatment with carbon dioxide gas for mold compositions A, B, C and D of Table III where the cure accelerating agent of this invention is omitted and the variable is the soda to silicate ratio as indicated in Table I. Composition E evidenced no cure in 90 seconds treatment with carbon dioxide and is beyond the coordinates of FIGURE 1 and thus not shown therein. It will be seen that composition A reached a maximum strength factor of about 220 in about 25 seconds of treatment with carbon dioxide and thereafter deteriorated. Composition B reached a maximum strength factor of about 440 at about 63 seconds treatment with carbon dioxide and thereafter began to deteriorate. Composition C reached a maximum strength factor of about 390 at about 60 seconds treatment with carbon dioxide and, as similar to compositions A and B, also began to deteriorate thereafter. Compositions D and E obviously required a carbon dioxide treatment time far in excess of compositions A, B and C.

From FIGURE 1 it might be presumed that compositions B and C would be superior to the other compositions for use with a cure accelerating agent. However, this is not true for referring to the graphs of FIGURE 2 it will be seen that compositions A–1, B–1, C–1, D–1 and E–1, which are the same as that of compositions A, B, C, D, and E, respectively, except that about 0.2 percent by weight of diethanolamine has been added as a cure accelerator, do not produce mold parts in accordance with that which might be expected from an examination of FIGURE 1. In FIGURE 2 it will be readily appreciated that compositions C–1 and D–1 are superior to that of compositions A–1, B–1 and E–1 although compositions A–1 and B–1 produced satisfactory mold parts in one minute or less carbon dioxide treatment time. From this it may be readily deduced that compositions C–1 and D–1 indicate the preferred soda to silicate range to be 1 part soda to 2.00–2.40 parts silica. However, solutions where the soda to silica ratio is of 1 part soda to 2.00–2.90 can be used with satisfactory results.

In further comparison of FIGURES 1 and 2 it will be seen that composition C (FIGURE 1) reached a maximum strength factor of about 390 in 60 seconds carbon dioxide treatment time. However, when composition C possessed as little as 0.2 percent by weight of diethanolamine curing agent of this invention (composition C–1) it reached the same strength factor of about 390 in about 14 seconds carbon dioxide treating time, a reduction of about 46 seconds, i.e., it took less than 25% of the carbon dioxide treating time to cure the mold parts to the maximum strength factor attainable without the cure accelerating agent of this invention. Further composition C–1 reached a maximum strength factor of about 600 in about 40 seconds as compared with composition C which reached a maximum strength factor of about 390 in 60 seconds.

Similar to the above composition D of FIGURE 1 required about 90 seconds of treatment to reach a strength factor of about 220 but when 0.2 percent by weight of diethanolamine was added (composition D–1) attained the same strength factor in only about 28 seconds as shown in FIGURE 2.

FIGURE 3 illustrates the effect of varying the amount of diethanolamine to composition D. Graph D is the same as that of FIGURE 1 and illustrates the effect of time of treatment with carbon dioxide on composition D which did not contain the accelerating agent of this invention. Graph D–2 shows the effect of adding only 0.1 percent by weight of diethanolamine and it will be readily observed that a sharp improvement is obtained over that of composition D. Graph D–1 is the same as that of FIGURE 2 and illustrates a further improvement when 0.2 percent by weight of diethanolamine is used. Graph D–3 represents the effect of adding 0.3 percent by weight of diethanolamine to composition D. It will be noted that composition D had a strength factor of about 220 after a 90 second treatment with carbon dioxide gas. Composition D–2 attained the same strength factor in about 35 seconds and composition D–1 attained the same result in about 29 seconds. Composition D–3 attained the same result in about 10 seconds. Thus it is readily apparent that a small amount of the accelerating agent of this invention not only greatly reduces the carbon dioxide curing time but also affords a product with an improved strength factor employing a much reduced curing time at a corresponding savings in both time and cost of carbon dioxide gas. Amounts of ethanolamine up to 1 percent by weight, based on the weight of the molding composition have been used. However, the higher amounts did not produce any appreciable advantage over the lesser amounts.

Triethanolamine as shown in Table III also greatly accelerates curing time but was found to be slightly less effective than diethanolamine. Monoethanolamine yields similar results to diethanolamine but exhibits some irritating tendencies toward operators. For these reasons diethanolamine is preferred.

The chemistry of the action of ethanolamine as an accelerator in these alkali-silicate bonded molding compositions is not clearly understood. It may be that the solubility of the alkali-silicate for reception of carbon dioxide gas is improved by the accelerating agent. On the other hand, ethanolamine might well act as a catalyst for the curing reaction. In any event it has been clearly shown that the addition of a small amount of the accelerating agent, ethanolamine, of this invention to conventionally known alkali-silicate bonded molding compositions greatly improves the strength of the mold parts formed therefrom while at the same time drastically reducing the amount of cure time and carbon dioxide gas required.

Having thus described preferred embodiments of the invention, it can now be seen that the objects of the invention have been fully achieved and it must be understood that changes and modifications might be made which do not depart from the spirit of the invention nor from the scope thereof as defined in the appended claims.

What is claimed is:

1. For accelerating the rate of cure of a mold part composition containing an alkali-metal silicate bonding agent curable with gaseous carbon dioxide, the method consisting of the step of adding to said composition an effective amount up to 1 percent by weight of ethanolamine as a cure rate accelerating agent.

2. For accelerating the rate of cure of a mold part composition containing an alkali-metal silicate bonding agent curable with gaseous carbon dioxide, the method consisting of the step of adding to said composition an effective amount up to 1 percent by weight of diethanolamine as a cure rate accelerating agent.

3. For accelerating the rate of cure of a mold part composition containing an alkali-metal silicate bonding agent curable with gaseous carbon dioxide, the method consisting of the step of adding to said composition an effective amount up to 1 percent by weight of monoethanolamine as a cure rate accelerating agent.

4. For accelerating the rate of cure of a mold part composition containing an alkali-metal silicate bonding agent curable with gaseous carbon dioxide, the method consisting of the step of adding to said composition an effective amount up to 1 percent by weight of triethanolamine as a cure rate accelerating agent.

5. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 1.90 and not more than 2.90 parts by weight of $SiO_2$, the method consisting of the step of adding to said composition an effective amount up to 1 percent by weight of ethanolamine as a cure rate accelerating agent.

6. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 1.90 and not more than 2.90 parts by weight of $SiO_2$, the method consisting of the step of adding to said composition an effective amount up to 1 percent by weight of diethanolamine as a cure accelerating agent.

7. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 1.90 and not more than 2.90 parts by weight of $SiO_2$, the method consisting of the step of adding to said composition an effective amount up to 1 percent by weight of triethanolamine as a cure accelerating agent.

8. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 1.90 and not more than 2.90 parts by weight of $SiO_2$, the method consisting of the step of adding to said composition an effective amount up to 1 percent by weight of monoethanolamine as a cure accelerating agent.

9. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 2.00 and not more than 2.40 parts by weight of $SiO_2$, the method consisting of the step of adding to said composition an effective amount up to 1 percent by weight of ethanolamine as a cure accelerating agent.

10. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 2.00 and not more than 2.40 parts by weight of $SiO_2$, the method consisting of the step of adding to said composition an effective amount up to 1 percent by weight of diethanolamine as a cure accelerating agent.

11. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 2.00 and not more than 2.40 parts by weight of $SiO_2$, the method consisting of the step of adding to said composition an effective amount up to 1 percent by weight of triethanolamine as a cure accelerating agent.

12. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 2.00 and not more than 2.40 parts by weight of $SiO_2$, the method consisting of the step of adding to said composition an effective amount up to 1 percent by weight of monoethanolamine as a cure accelerating agent.

13. For accelerating the rate of cure of a mold part composition containing sodium silicate as a bonding agent curable with gaseous carbon dioxide, said sodium silicate bonding agent having a soda-to-silica ratio of 1 part $Na_2O$ to at least 1.90 and not more than 2.90 parts by weight of $SiO_2$, the method consisting of the step of adding to said composition from 0.1 to 0.3 percent by weight of ethanolamine as a cure accelerating agent.

14. For accelerating the rate of cure of a mold part composition containing sodium silicate as a bonding agent curable with gaseous carbon dioxide, said sodium silicate bonding agent having a soda-to-silica ratio of 1 part $Na_2O$ to 2 parts by weight of $SiO_2$, the method consisting of the step of adding to said composition about 0.2 percent by weight of monoethanolamine as a cure accelerating agent.

15. For accelerating the rate of cure of a mold part composition containing sodium silicate as a bonding agent curable with gaseous carbon dioxide, said sodium silicate bonding agent having a soda-to-silica ratio of 1 part $Na_2O$ to 2 parts by weight of $SiO_2$, the method consisting of the step of adding to said composition about 0.3 percent by weight of triethanolamine as a cure accelerating agent.

References Cited in the file of this patent

UNITED STATES PATENTS 2,926,098   Ilenda et al. _____ Feb. 23, 1960

FOREIGN PATENTS 203,919   Australia _____ Aug. 31, 1956
976,384   France _____ Oct. 25, 1950